(12) United States Patent
Yoshida

(10) Patent No.: US 11,599,401 B2
(45) Date of Patent: Mar. 7, 2023

(54) INFORMATION PROCESSING SYSTEM, INFORMATION PROCESSING METHOD, AND NON-TRANSITORY RECORDING MEDIUM

(71) Applicant: Tomoki Yoshida, Kanagawa (JP)

(72) Inventor: Tomoki Yoshida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 17/305,539

(22) Filed: Jul. 9, 2021

(65) Prior Publication Data
US 2022/0035690 A1 Feb. 3, 2022

(30) Foreign Application Priority Data
Jul. 31, 2020 (JP) .............................. JP2020-131128

(51) Int. Cl.
*G06F 11/00* (2006.01)
*G06N 7/00* (2023.01)
*G06F 11/36* (2006.01)

(52) U.S. Cl.
CPC ........ *G06F 11/008* (2013.01); *G06F 11/3676* (2013.01); *G06N 7/005* (2013.01)

(58) Field of Classification Search
CPC ........................... G06F 11/008; G06F 11/3676
See application file for complete search history.

(56) References Cited

U.S. PATENT DOCUMENTS

| 6,868,473 B2 * | 3/2005 | Bacon | G11C 16/349 365/185.01 |
| 2002/0147873 A1 * | 10/2002 | Kwon | G06F 11/302 710/200 |
| 2008/0310864 A1 | 12/2008 | Katoh | |

FOREIGN PATENT DOCUMENTS

| CN | 111679789 A * | 9/2020 | ........... G06F 3/0616 |
| JP | 5-073435 | 3/1993 | |
| JP | 2008-310579 | 12/2008 | |
| JP | 2015-138296 | 7/2015 | |

* cited by examiner

*Primary Examiner* — Nadeem Iqbal
(74) *Attorney, Agent, or Firm* — IPUSA, PLLC

(57) ABSTRACT

An information processing system, an information processing method, and a non-transitory recording medium. The information processing system receives from a device, a number of times of writing operations to one or more memories included in the device and counter information of the device, determines whether there is a malfunction or a probability of malfunction based on the number of times of writing operations received from the device, and identifies software that causes or is likely to cause the malfunction based on the counter information in response to determination of the malfunction, or the probability of malfunction.

6 Claims, 9 Drawing Sheets

```
2016.09.21 14:38:42.25 REGISTOR_A 50
2016.09.21 14:38:42.26 REGISTOR_B 10
2016.09.21 14:38:42.27 REGISTOR_C 20
2016.09.21 14:38:42.30 REGISTOR_D 13
2016.09.21 14:38:42.99 REGISTOR_E 5
2016.09.21 14:40:05.81 FIXING_30_degrees
2016.09.21 14:41:44.34 SC101
2016.09.21 14:45:01.25 SENSOR_A ON
2016.09.21 14:45:01.50 SENSOR_B ON
2016.09.21 14:45:01.70 SENSOR_A OFF
2016.09.21 14:46:02.01 SENSOR_C ON
2016.09.21 14:46:15.73 SENSOR_B OFF
2016.09.21 14:46:59.09 SENSOR_C OFF
2016.09.21 14:49:39.90 MOTOR_A CURRENT 0.155 mA
2016.09.21 14:50:44.34 SC998
2016.09.21 14:51 eMMC_write
2016.09.21 14:52 HDD_current_on
2016.09.21 14:52 HDD_accesstime 0.2ms
2016.09.21 14:53 HDD_current_off
2016.09.21 14:54 print_count 1593
. . . . . . .
. . . . . . .
. . . . . . .
```

FIG. 12

| |
|---|
| 301 — TRANSMISSION DATE AND TIME: FEBRUARY 3, 20XX |
| 302 — TRANSMITTED BY: MAINTENANCE SERVER |
| 303 — DESTINATION: PRINT APPLICATION MANAGER MR. XXX |
| 304 — SUBJECT: MALFUNCTION DETECTED |
| 305 — MALFUNCTION DETECTED IN PRINT APPLICATION |
| 306 — DETECTION METHOD: A. DETERMINED FROM DIFFERENCE BETWEEN ESTIMATE AND ACTUAL DATA |
| 307 — PARAMETER: NUMBER OF PRINTS |
| 308 — CUSTOMER ID: 0123 |
| 309 — MPF ID: ABC |

INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-131128, filed on Jul. 31, 2020, in the Japan Patent Office, the entire disclosure of which is hereby incorporated by reference herein.

BACKGROUND

Technical Field

The present disclosure relates to an information processing system, an information processing method, and a non-transitory recording medium.

Related Art

A malfunction may occur in a device used by a user. For example, a malfunction may occur in a flash memory (embedded Multimedia Card (eMMC), Not AND (NAND), or the like) or a hard disk drive (HDD) mounted on a multifunction peripheral (MFP) due to excessive writing operation or the like. Since devices are increasingly sophisticated and complicated, it is often difficult for the user to cope with the malfunction.

SUMMARY

Embodiments of the present disclosure describe an information processing system, an information processing method, and a non-transitory recording medium. The information processing system receives from a device, a number of times of writing operations to one or more memories included in the device and counter information of the device, determines whether there is a malfunction or a probability of malfunction based on the number of times of writing operations received from the device, and identifies software that causes or is likely to cause the malfunction based on the counter information in response to determination of the malfunction, or the probability of malfunction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a graph illustrating an example of correspondence between a number of elapsed days in which a device is installed in a customer and a number of times of writing operations to a flash memory or the like;

FIG. 12 is a diagram illustrating contents of an e-mail sent to an application manager.

Figure 1:
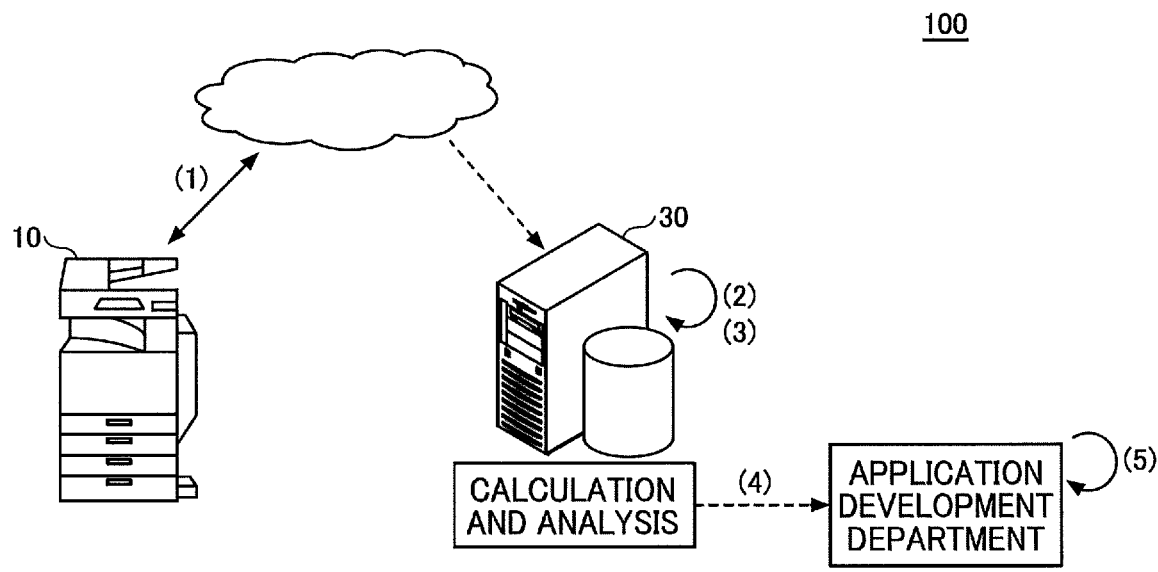
FIG. 1 is a diagram illustrating an overview of an operation of a maintenance system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a maintenance system, a maintenance server, and a maintenance method performed by the maintenance system is described as an example of embodiments of the present disclosure with reference to the drawings.

FIG. 1 is a diagram illustrating an overview of an operation of the maintenance system 100 according to the present embodiment. (1) A device 10 collects log data indicating a state of the device 10 and transmits the log data to the maintenance server 30 periodically (or in response to an operation or the like). (2) The maintenance server 30 uses an analysis tool to determine presence or absence of a malfunction or determine that there is a high possibility of malfunction occurring. Specifically, a following process is performed. A standard frequency of use of a component of the device is estimated in advance by a manufacturer or the like, and a malfunction is detected from a difference between an estimated frequency and an actual frequency (refer to FIG. 2). A malfunction is detected when the frequency of use is rapidly increasing. A malfunction is detected when a lifetime of the component is likely to exceed. (3) When a malfunction is detected, the maintenance server 30 identifies an application to be investigated based on the acquired log data. For example, when the component is a flash memory, counter information such as a number of prints that is increasing in a certain period in which the frequency of use of the flash memory is increasing is identified. Then, the application used for printing is identified. (4) The maintenance server 30 notifies an application design department that has developed the application of the malfunction of the probability of malfunction by an e-mail or the like. The log data may also be transmitted. (5) If a problem is found with the application as a result of investigation by an application manager in the application design department, the application design department cooperates with a customer support department to update the application and firmware related to the application for the user (customer).

Figure 2:
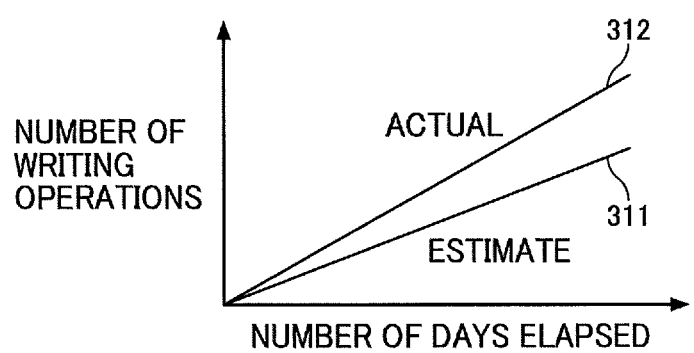

FIG. 2 is a graph illustrating an example of correspondence between a number of days elapsed since the device 10 is installed at the customer site and a number of times of writing operations to the flash memory or the like. FIG. 2 illustrates an estimate graph 311 and an actual graph 312 included in the log data. The number of times of writing operations per day in a standard usage mode based on a number of employees on the user side and business type is statistically estimated in advance. The estimate graph 311 is a graph indicating correspondence between the number of times of writing operations per day in the standard usage mode and the number of elapsed days. On the other hand, the actual graph 312 is a graph indicating correspondence between actual number of times of writing operations per day in the flash memory or the like by the user using the device 10 and the number of elapsed days.

Therefore, when the actual graph 312 is larger than the estimate graph 311 in slope by the threshold value or more, the maintenance server 30 determines that there is a probability that a malfunction has occurred or that there is a probability that a malfunction will occur.

A component such as the flash memory may be accessed by the application in operation. On the other hand, there are applications that only read the flash memory and applications that do not use the flash memory at all. Therefore, as described above in (3), the maintenance server 30 can identify the application based on the number of times of writing operations. In this case, the application design department may perform an improvement on the application to reduce the frequency of writing operation to the flash memory by the application. In addition, the customer support department can replace the flash memory at an early stage regardless of improvement of the application.

As described above, the maintenance system 100 according to the present embodiment can identify the cause of the malfunction of the device. For example, an application related to the malfunction can be identified.

Software is a computer program that is information for issuing instructions to a computer. The computer program includes application software. The application software is software to which a computer program is applied in accordance with an intended use such as word processing or spreadsheet. In the present embodiment, the application software is simply referred to as an application.

Memory information is information related to one or more memories included in the device. The memories are, for example, a flash memory such as an eMMC and a NAND or an HDD. The memory information is described by a term "log data" in the present embodiment.

Counter information of the device includes a number of pages processed by the device and a number of operations of various functions. The counter information is counted in order to charge a usage fee of the device.

A malfunction indicates a state different from a normal state. The malfunction may be referred to as a failure, a trouble, a defect, or the like. The malfunction may be referred to as an abnormal state. A probability of malfunction indicates that it is not abnormal at present but can be predicted to become abnormal.

Figure 3:
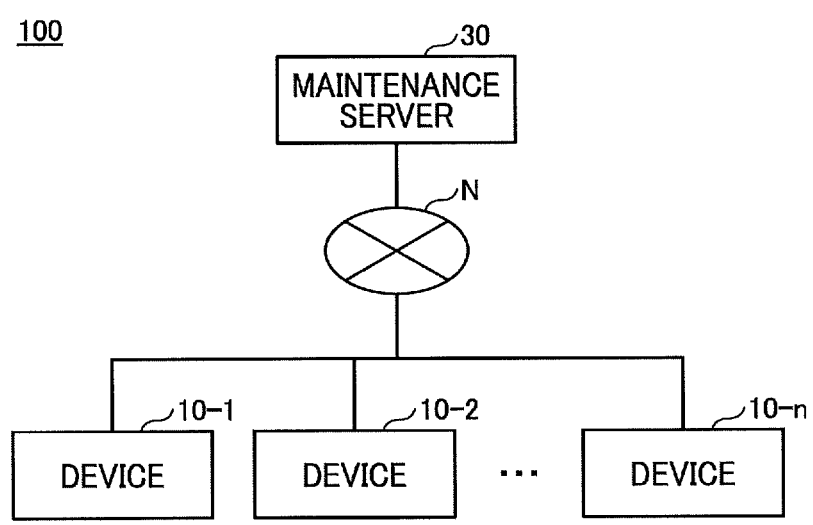
FIG. 3 is a block diagram illustrating an example of schematic configuration of the maintenance system.

FIG. 3 is a block diagram illustrating an example of schematic configuration of the maintenance system 100. The maintenance system 100 includes one or more devices 10 and the maintenance server 30 capable of communicating through a network N with each other.

The network N is implemented partly or entirely by a local area network (LAN) implemented in a facility or the like in which the device 10 is installed, a WIDE AREA ETHERNET (registered trademark), a wide area network (WAN) in which LANs are connected to each other, a virtual private network (VPN), a telephone network of a communication carrier, the internet, or the like.

The devices 10-1 to 10-$n$ (referred to as the device 10 when distinction is not necessary) are devices operated by a user and are devices in which a malfunction may occur. One or more devices 10 may be installed at one customer site. A customer may be, for example, an organization, institution, company, enterprise, cooperative, federation, union, etc.

In addition, the device 10 supports efficiency of business by inputting or outputting electronic information used by the user for business. In the device 10, application software for printing, scanning, and the like operates, and browser software for communicating with various servers operates. For example, the device 10 is a multifunction peripheral (MFP). The multifunction peripheral refers to an apparatus having a plurality of functions such as a scan function, a print function, a copy function, and a facsimile transmission and reception function. The MFP may be referred to as a scan print copy (SPC), or an all in one (AIO). In the present embodiment, the device 10 is not required to have a plurality of functions, and may be a scanner, a printer, a copier, a facsimile, or the like.

In addition, the device 10 is not limited to the MFP, and may be any device that can transmit log data to the maintenance server 30. For example, a video conference terminal, an electronic whiteboard, a projector, or the like may be used. Alternatively, the device 10 may be an information processing apparatus such as a personal computer (PC), a tablet device, a smartphone, a personal digital assistant (PDA), a game machine, a navigation terminal, or a wearable PC.

The maintenance server 30 is an information processing system including one or more information processing apparatuses, which provides information and functions to the device 10 through the network N. The maintenance server 30 analyzes the log data acquired from the device 10 and detects or predicts the occurrence of the malfunction in the device 10. The maintenance server 30 notifies the application manager related to the malfunction that the malfunction is detected or predicted by an e-mail or the like.

The maintenance server 30 may be implemented by cloud computing. The cloud computing refers to a usage pattern in which resources on a network are used without a user being aware of specific hardware resources. In a case where the cloud computing is used to implement the maintenance server 30, hardware configuration of the maintenance server 30 is not limited to the one described in the present embodiment, and the maintenance server 30 may be configured by dynamically connecting or disconnecting some hardware resources according to a load or the like. The maintenance server 30 may reside on on-premise network.

Figure 4:
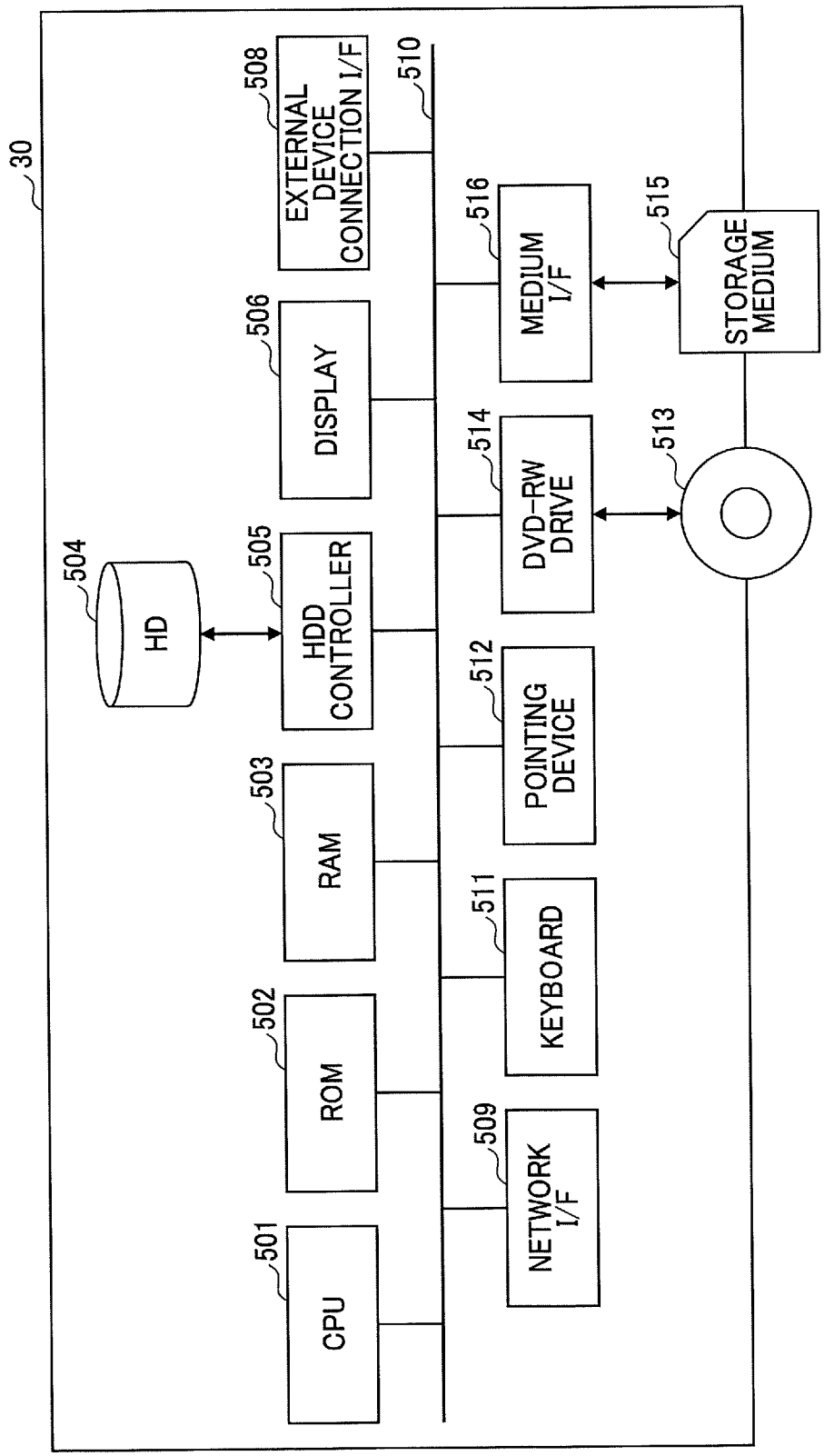
FIG. 4 is a block diagram illustrating an example of a hardware configuration of a maintenance server according to embodiments of the present disclosure.

FIG. 4 is a block diagram illustrating an example of a hardware configuration of the maintenance server 30 according to the present embodiment. As illustrated in FIG. 4, the maintenance server 30 is implemented by a computer including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, network I/F 509, a bus line 510, a keyboard 511, a pointing device 512, a digital versatile disc rewritable (DVD-RW) drive 514 and a medium I/F 516.

Among these components, the CPU 501 controls the operation of the entire maintenance server 30. The ROM 502 stores a program such as an initial program loader (IPL) used for driving the CPU 501. The RAM 503 is used as a work area for the CPU 501. The HD 504 stores various data such as programs. The HDD controller 505 controls reading and writing operation of various data from and to the HD 504 under control of the CPU 501. The display 506 displays various information such as a cursor, menu, window, character, or image. The external device connection I/F 508 is an interface for connecting various external devices. The external device in this case is, for example, a universal serial bus (USB) memory or a printer. The network I/F 509 is an interface for performing data communication using the network N. The bus line 510 is an address bus, a data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of an input device that allows a user to select or execute a specific instruction, selects a target for processing, or moves a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing operation (storing) of data from and to a storage medium 515 such as the flash memory.

Figure 5:
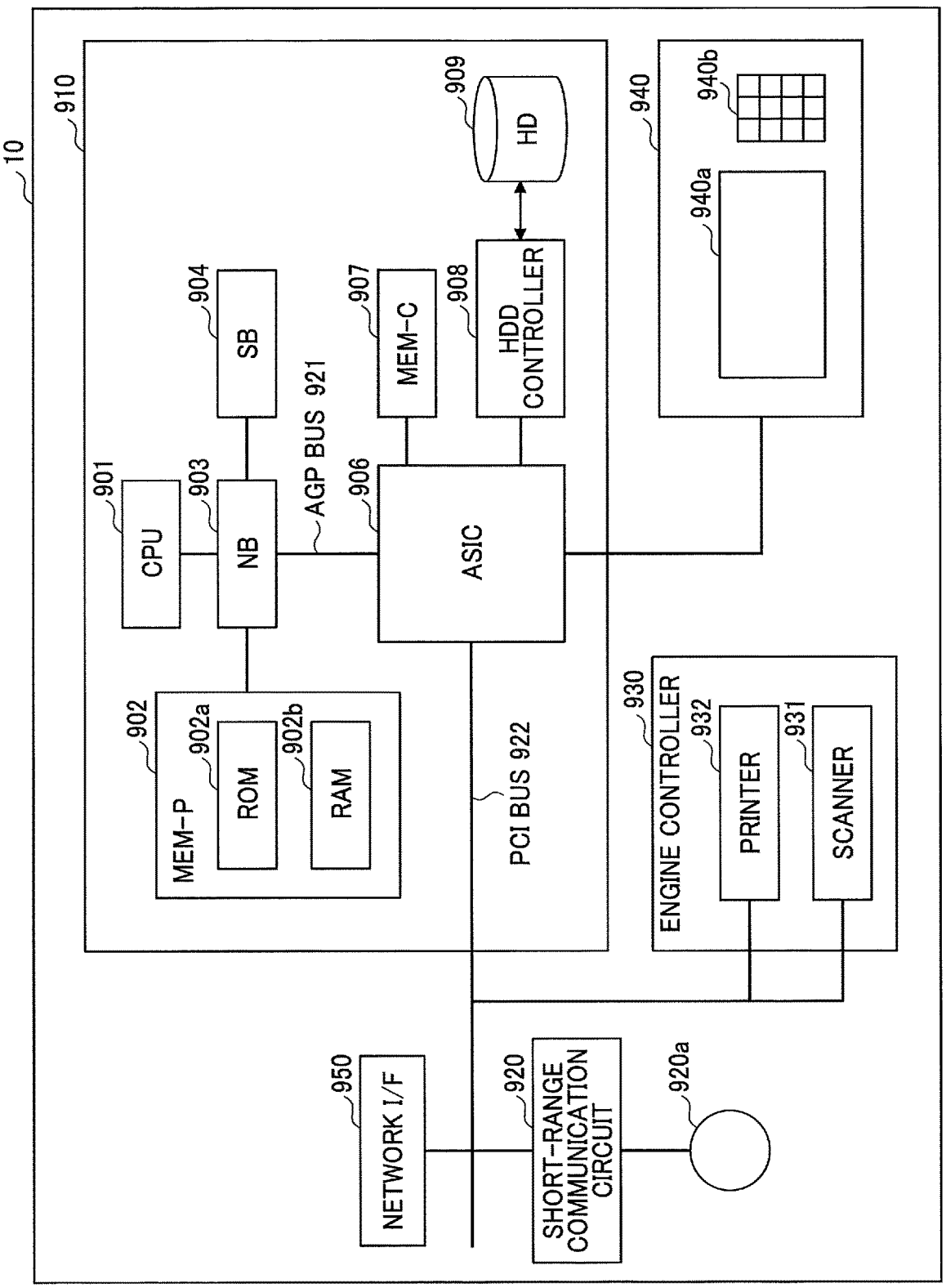
FIG. 5 is a block diagram illustrating an example of a schematic hardware configuration of the device.

FIG. 5 is a block diagram illustrating an example of a schematic hardware configuration of the device 10. In FIG. 5, an MFP is assumed as the device. As illustrated in FIG. 5, the device (MFP) 10 includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a processor that performs overall control of the device 10. The NB 903 connects the CPU 901 with the MEM-P 902, SB 904, and AGP bus 921 and includes a memory controller for controlling reading or writing operation of various data with respect to the MEM-P 902, a Peripheral Component Interconnect (PCI) master, and an AGP target.

The MEM-P 902 includes a ROM 902a as a memory that stores program and data for implementing various functions of the controller 910 and further includes a RAM 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by the computer for distribution.

The SB 904 connects the NB 903 with a peripheral component interconnect (PCI) device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 is a storage for storing image data, font data used during printing, and forms. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The control panel 940 includes a display panel 940a implemented by, for example, a touch panel that displays current settings or a selection screen and receives a user input and an operation panel 940b including a numeric keypad that receives set values of various image forming parameters such as image density parameter and a start key that accepts an instruction for starting copying. The controller 910 controls all operations of the device 10, for example, drawing, communication, or user input to the control panel 940. The scanner 931 or the printer 932 includes an image processing unit such as error diffusion processing and gamma conversion processing.

In response to an instruction to select a specific application through the control panel 940, for example, using a mode switch key, the device 10 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 950 is an interface for performing data communication using the network N. The short-range communication circuit 920 and the network I/F 950 are electrically connected to the ASIC 906 through the PCI bus 922.

Figure 6:
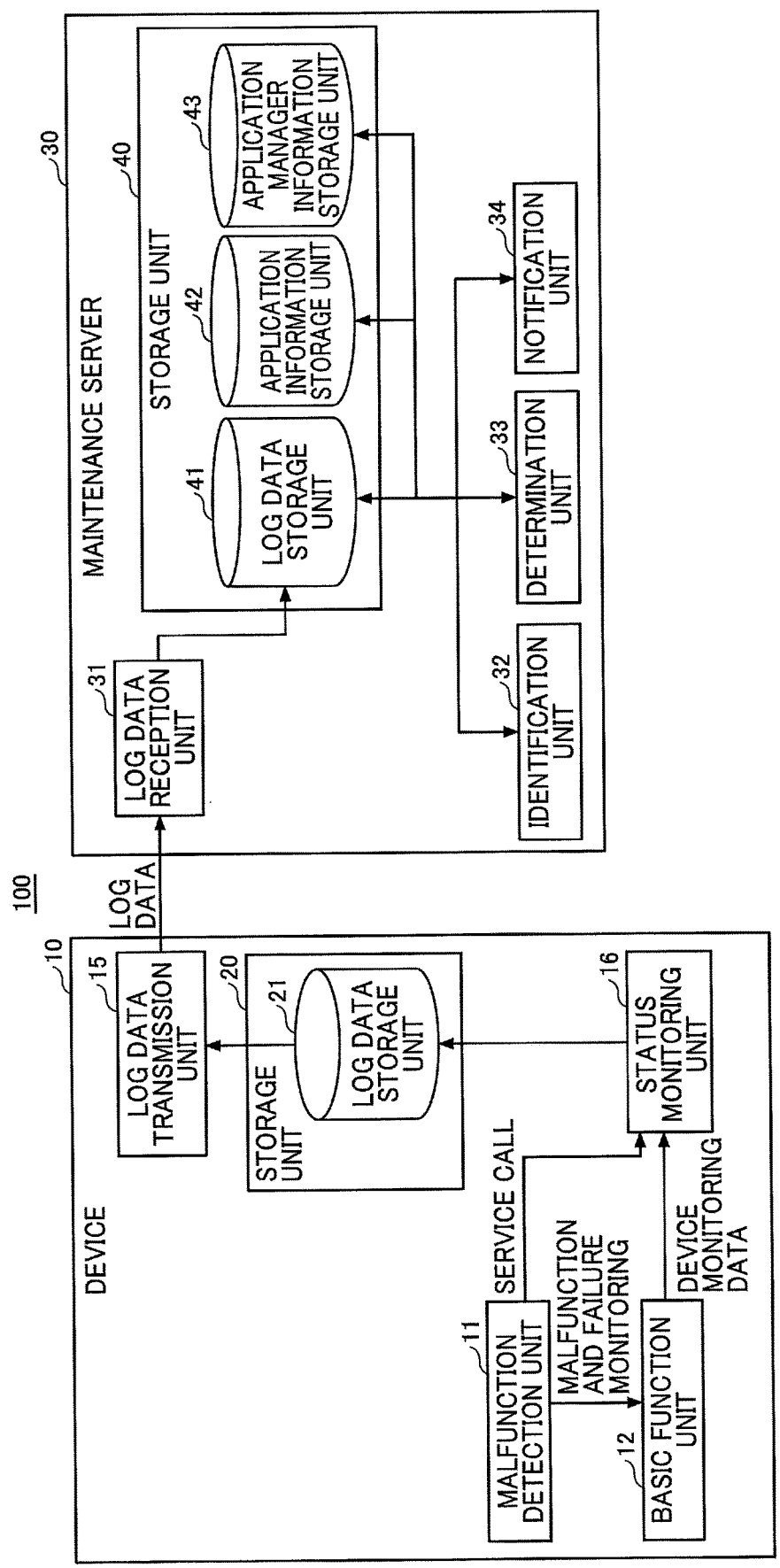
FIG. 6 is a block diagram illustrating an example of a functional configuration of the device and the maintenance server included in the maintenance system.

FIG. 6 is a block diagram illustrating an example of functional configuration of the device 10 and the maintenance server 30 included in the maintenance system 100.

The device 10 includes a malfunction detection unit 11, a basic function unit 12, a log data transmission unit 15, and a status monitoring unit 16. These functions of the device 10 are implemented by the CPU 901 executing a program developed from the HD 909 to the RAM 902b illustrated in FIG. 5. Note that the program may be distributed from a server for program distribution or may be distributed while being stored in a portable storage medium such as a USB memory or an optical storage medium.

The basic function unit 12 provides basic functions of the device 10 in response to a user operation or the like. For example, a print function, a scanner function, a copy function, a facsimile function, and the like are provided. Each function is controlled by a separate application including a user interface. For example, the print function is controlled by a print application, the scanner function is controlled by a scanner application, the copy function is controlled by a copy application, and the facsimile function is controlled by a facsimile application.

Therefore, the basic function unit 12 performs control of an actuator (a motor, a clutch, or the like) necessary for providing each function, on or off of a switch, temperature control of a fixing unit, control of a sensor, writing operation to the flash memory or the HDD, and the like.

The status monitoring unit 16 monitors the basic function unit 12 and acquires device monitoring data indicating the state of the device 10. It is preferable that the device monitoring data include the state of the device 10 which is estimated to be highly related to the malfunction. For example, the device monitoring data includes a passing time of a sheet, a current value of the motor, temperature of the fixing unit, a value of a register of the ASIC, writing operation to the flash memory, on or off of the HDD, and the like. The status monitoring unit 16 stores the device monitoring data and service call (SC) described below as log data in the log data storage unit 21.

A malfunction detection unit 11 monitors the presence or absence of malfunction of the basic function unit 12. In the present embodiment, the maintenance server 30 is notified of the malfunction by predetermined information called the service call. The malfunction is also an aspect of the state of the device 10. However, the state (device monitoring data) is only the state of the device, whereas the service call indicates that failure has occurred. Many service calls indicate that a failure difficult to recover by the user alone has occurred.

The log data transmission unit 15 transmits the log data stored in the log data storage unit 21 to the maintenance server 30 at a predetermined timing. The predetermined timing is, for example, immediately after a service call is detected, at a regular timing (hourly, half-day, daily, weekly, etc.), at a timing when a certain amount of log data is accumulated, or when a fixed operation is detected.

The device 10 includes a storage unit 20 implemented by the HD 909 or the RAM 902b illustrated in FIG. 5. A log data storage unit 21 is implemented in the storage unit 20. The log data storage unit 21 stores the log data (device monitoring data and service calls) collected by the status monitoring unit 16. The log data in the log data storage unit 21 is deleted when transmitted to the maintenance server 30. The log data is described below with reference to FIG. 7.

The maintenance server 30 includes a log data reception unit 31, an identification unit 32, a determination unit 33, and a notification unit 34. Each of these functions of the maintenance server 30 is implemented by the CPU 501 executing a program developed from the HD 504 to the RAM 503 illustrated in FIG. 4. Note that the program may be distributed from a server for program distribution or may be distributed while being stored in a portable storage medium such as a USB memory or an optical storage medium.

The maintenance server 30 includes a storage unit 40 implemented by the HD 504 or the RAM 503 illustrated in FIG. 4. The storage unit 40 includes a log data storage unit 41, an application information storage unit 42 (an example of a first storage area), and an application manager information storage unit 43 (an example of a second storage area). The log data stored in the log data storage unit 41 is the same as the log data transmitted by the device 10, but the log data from each device 10 is stored in the maintenance server 30.

TABLE 1

| Parameter | Application |
| --- | --- |
| Number of Prints | Print Application |
| Number of Scans | Scan Application |
| Number of Accesses to HDD | Print Application, Scan Application |

Table 1 is an example of application information (an example of software information) stored in the application information storage unit 42. The application name is set in association with parameters extracted from the log data. The parameters are the type of counter information included in the log data (the number of copies, the number of prints, the number of facsimile transmissions and receptions, the number of scans, the number of main power ON times, the number of energy saving transitions and returns, etc.).

For example, the parameter "number of prints" corresponds to the print application. The parameter "number of scans" corresponds to the scan application. The parameter "number of HDD accesses" corresponds to the scan application and the print application (a plurality of applications may be managed in association with the parameter).

The application name of the application that increases each parameter is associated with the parameter based on prior knowledge. For example, the print application increases the number of prints. Therefore, the identification unit 32 can identify the corresponding application according to the parameter by referring to Table 1.

TABLE 2

| Application | Application Manager | Application Manager's Address |
| --- | --- | --- |
| Print Application | AAA | xxx@xxx |
| Scan Application | BBB | yyy@yyy |

Table 2 is an example of the application manager information stored in the application manager information storage unit 43. The application manager information is information related to a manager in charge of the application. The application manager information includes an application name, a manager name, and a manager's address. The notification unit 34 can automatically transmit an e-mail to the application manager with the manager's address as a notification destination by referring to the application manager information. It is preferred that at least the name of the application that caused the malfunction is included in the e-mail. However, the information included in the e-mail is not limited to the name of the application that caused the malfunction, and may include the parameter name, a malfunction type, and the like.

Referring again to FIG. 6, further description is given below. The log data reception unit 31 receives the log data from the device 10 and stores the log data in the log data storage unit 41 implemented in the storage unit 40.

The determination unit 33 analyzes the log data to determine whether a malfunction has occurred in the component or whether there is a probability that a malfunction will occur. A detailed description of this process is described below. When a malfunction or a probability thereof is detected, the identification unit 32 refers to the Table 1 stored in the application information storage unit 42 to identify the application related to the component in which the malfunction is detected.

The notification unit 34 refers to the application manager information in Table 2 and transmits an e-mail to the application manager in which the malfunction or the probability thereof is detected. Social network service (SNS) may be used for transmission instead of e-mail.

Figures 7, 8:
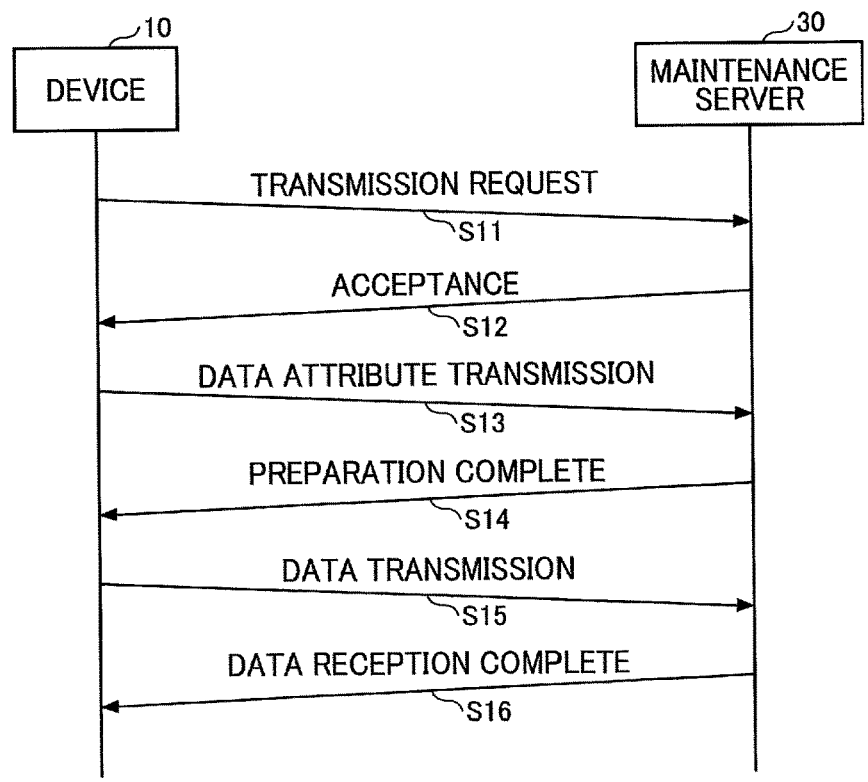
FIG. 7 is a schematic diagram illustrating an example of log data.
FIG. 8 is a sequence diagram illustrating an example of a process in which a device transmits log data to the maintenance server.

FIG. 7 is a schematic diagram illustrating an example of the log data. FIG. 7 illustrates time-series log data in the order in which the log data was acquired. The device 10 always collects data (device monitoring data and service calls) indicating the state of the device 10. Since the cause of the malfunction of the device 10 varies, it is preferable that the states of various devices 10 are monitored in advance and recorded as log data. The log data illustrated in FIG. 7 has the following contents. Note that the occurrence date and time is recorded in each log data.

"SC101" is an example of the service call indicating an occurrence of a SC101, output in the form of "SC+number". The content (type) of the service call can be known by this number.

"SENSOR_A ON" and "SENSOR_A OFF" are examples of the log data for recording the time from the start of sheet conveyance to the passage of each sheet passage sensor. That is, the time required for the sheet to pass can be determined by the elapsed time from the time when SENSOR_A is turned on to the time when SENSOR_A is turned off. There is a possibility that a cause of a malfunction is hidden when it takes longer time than the standard time to convey the sheet.

"MOTOR_A CURRENT" is log data of a motor name and a current value. "MOTOR_A" is a name of a sheet conveyance motor, and "0.155 mA" is the current value. Since a high current value indicates that it is difficult to feed the sheet, there is a possibility that a cause of a malfunction is hidden when the current value of the sheet conveyance motor is high.

"FIXING_30 degrees" indicates the temperature (30 degrees) of a fixing unit. If the temperature of the fixing unit is too high or does not rise, a cause of malfunction may be hidden.

"REGISTER_A 50" is an example of log data in which a value (50) set by the CPU in a register (REGISTER_A) of the image processing ASIC and a set time are recorded. The value set in the register (REGISTER_A) of the ASIC is the number of a filter used for image processing, the number of a gamma conversion table, or the like, and a correct value needs to be set in the register before the sheet passes through a certain position. Since the timing at which the sheet has passed is recorded in the log data such as SENSOR_A ON and SENSOR_A OFF, the deviation (delay) of the timing can be detected from this timing, the value of register, and the set time. When the timing is delayed, a cause of malfunction may be hidden.

"EMMC_write" is an example of log data indicating the time in which a writing operation is made on the eMMC (flash memory). Not only the writing operation but also a reading time are recorded in the log data.

"HDD_current_on" is an example of log data indicating the time at which the HDD is energized. For example, the log data is recorded when the power of the apparatus is turned on or when the apparatus returns from sleep mode.

"HDD_current_off" is an example of log data indicating the time at which the power supply to the HDD is terminated. For example, the log data is recorded when the power of the apparatus is turned off or the apparatus shifts to sleep mode.

"HDD_accesstime 0.2 ms" is an example of log data indicating an access time which is a sum of a seek time, rotation waiting time, and data transfer time when data is read from or written to the HDD. In this example, the access time is 0.2 seconds.

"Print_count 1593" is an example of log data indicating the number of prints from installation to the present. Since the log data is associated with the date and time, the maintenance server 30 can calculate an amount of increase in the number of prints in a certain period. The number of prints is one of the counter information. The counter information includes the number of copies, the number of prints, the number of facsimile transmissions and receptions, the number of scans, the number of main power ON times, the number of energy saving shift and return times, on or off information of various settings (for example, setting of validity or invalidity of a user authentication function), and the like.

The log data in FIG. 7 is merely an example, and any information that can be acquired from the device 10 can be used as the log data. The log data also includes counter information other than the number of prints.

FIG. 8 is a sequence diagram illustrating an example of a process in which the device 10 transmits log data to the maintenance server 30. Note that "S" of "S+number" indicates a step.

In step S11, the log data transmission unit 15 of the device 10 transmits a transmission request of log data of the device 10 to the maintenance server 30 using a predetermined communication protocol. The predetermined protocol may be Hypertext Transfer Protocol Secure (HTTPS), Hypertext Transfer Protocol (HTTP) 2.0, Hypertext Transfer Protocol (HTTP), File Transfer Protocol (FTP), Web-based Distributed Authoring and Versioning (WebDAV), or the like.

In step S12, when the maintenance server 30 is in a state that it is capable of receiving the log data, a message indicating acceptance is transmitted to the device 10. For example, in a case where the maintenance server 30 has a large load due to another task, the transmission of the log data is rejected. When the data transmission is rejected, the device 10 makes a transmission request again after a lapse of a predetermined time.

In step S13, the log data transmission unit 15 of the device 10 transmits data attributes such as a size of the log data to be transmitted, a data compression method, and an encryption method to the maintenance server 30.

In step S14, the log data reception unit 31 of the maintenance server 30 secures a space in a memory sufficient to process receiving of the log data and notifies completion of preparation for receiving the log data. When the memory size sufficient to process receiving of the log data cannot be secured, the log data reception unit 31 instruct the device 10 to divide the log data for transmission.

In step S15, the log data transmission unit 15 of the device 10 starts transmission of the log data.

In step S16, the log data reception unit 31 of the maintenance server 30 determines whether all the log data has been received based on the size of data that is received and transmits data reception completion to the device 10 when all the log data has been received.

Figure 9:
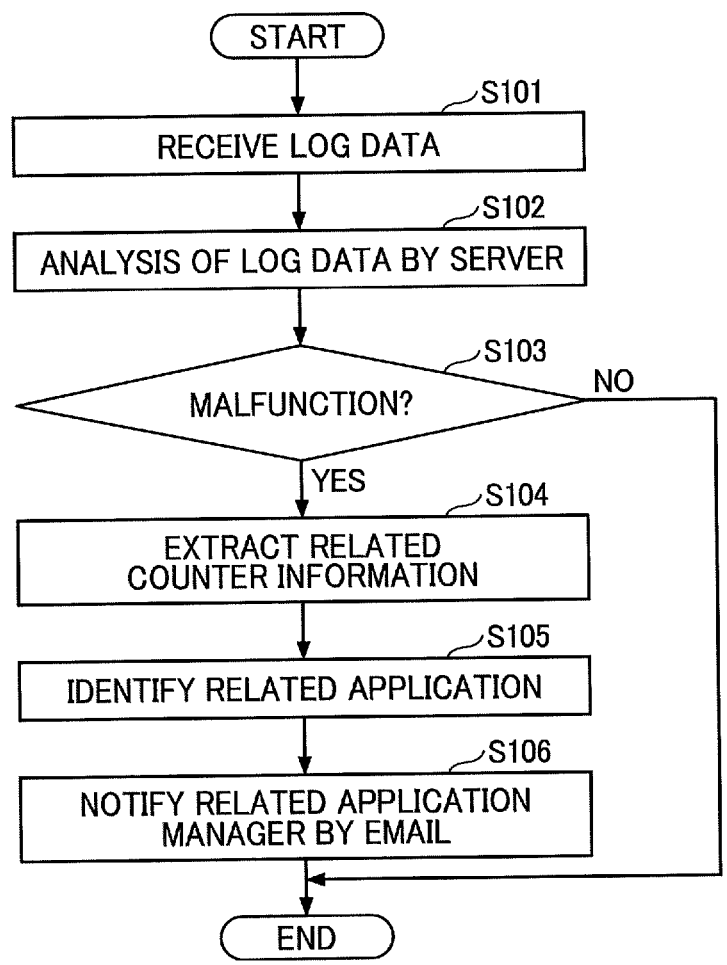
FIG. 9 is a flowchart illustrating an example of a process in which the maintenance server analyzes log data and detects a malfunction or a probability of the malfunction.

A process executed by the maintenance server 30 to analyze the log data is described with reference to FIG. 9. FIG. 9 is a flowchart illustrating an example of a process in which the maintenance server 30 analyzes log data and detects a malfunction or a probability of malfunction.

In step S101, the log data reception unit 31 of the maintenance server 30 receives the log data as described in FIG. 8.

In step S102, the determination unit 33 determines whether there is a malfunction or a probability of malfunction, in response to receiving of the new log data. The following three methods A to C are described as examples of determination methods.

A. Determination from Difference Between Estimate and Actual Results

The log data for determination includes the difference between the estimate and the actual result of the number of times of writing operations to the flash memory, the operation time of the HDD (time from HDD_current_on to HDD_current_off), the access time of the HDD, or the like in association with the date and time. As described with reference to FIG. 2, the maintenance server 30 stores standard data indicating the standard number of times of writing operations and the standard energization time with respect to the number of elapsed days of the flash memory or the HDD (which is considered to be the number of days during which the user used the device 10). The determination unit 33 compares the actual number of times of writing operations or the energization time with respect to the number of elapsed days with the standard data, and determines that there is a malfunction or a probability of malfunction when the number of times of writing operations or the energization time is larger than the standard data by a threshold or more.

Since the number of times of writing operations in a certain number of elapsed days increases as the number of elapsed days increases, the difference between the actual number of times of writing operations and the standard number of times of writing operations is likely to be affected by the number of elapsed days. Therefore, the determination unit 33 may compare a ratio of the actual number of times of writing operations and the standard number of times of writing operations with a threshold. For example, to determine that there is a malfunction or a probability of malfunction when the actual number of times of writing operations is greater than the standard number of times of writing operations by 50% or more, it is determined whether "actual number of times of writing operations/standard number of times of writing operations>1.5" is satisfied.

B. Determination According to an Increase Rate of Use Frequency of a Function

Based on the log data, the determination unit 33 can calculate the increase rate with respect to the number of elapsed days of the number of times of writing operations to the flash memory and of the energization time to the HDD.

Figure 10:
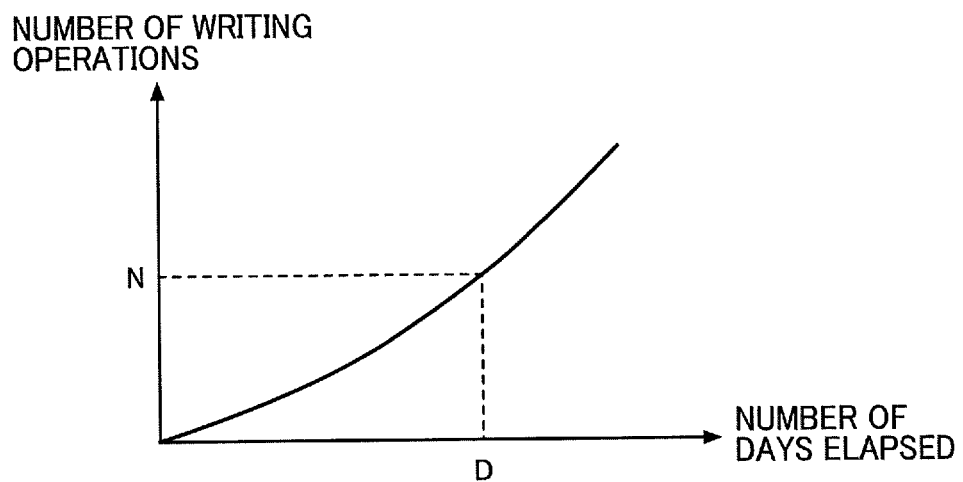
FIG. 10 is a graph illustrating an increase rate of the number of times of writing operations to the flash memory with respect to the number of elapsed days.

FIG. 10 is a graph illustrating the increase rate of the number of times of writing operations to the flash memory with respect to the number of elapsed days. When the number of elapsed days is D, the number of times of writing operations is N. In this case, the increase rate is as follows. Increase rate=N/D. The increase rate may be calculated by dividing the number of times of writing operations by the number of elapsed days of a certain period instead of dividing the number of times of writing operations by the total number of elapsed days. When the increase rate is equal to or greater than a threshold value, the determination unit 33 can determine that there is a malfunction or a probability of malfunction.

Alternatively, the increase rate calculated from the log data may be compared with standard data indicating an increase rate of the standard number of times of writing operations to the flash memory, and when the calculated increase rate is larger than the standard increase rate by a threshold or more, it may be determined that there is a malfunction or a probability of malfunction.

C. Determination from a Life of Component

The determination unit 33 stores life information of each component. For example, in the case of the flash memory, the number of times of writing operations=one million times is the life information (one million times is an example). In the case of the HDD, the operation time=50000 hours is the life information (50000 hours is an example).

The determination unit 33 predicts the number of times of writing operations and the operation time in the future based on the number of times of writing operations and the operation time included in the log data.

Figure 11:
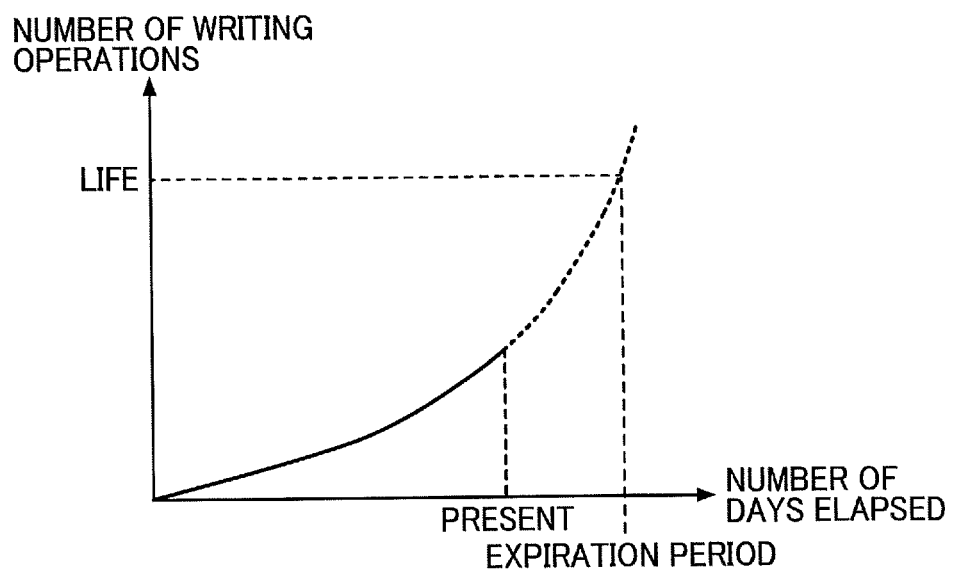
FIG. 11 is a graph illustrating a method of predicting a number of future writing operations to a flash memory.

FIG. 11 is a graph illustrating a method of predicting a number of times of writing operations to the flash memory in the future. In the log data, the number of times of writing operations is recorded in association with the date and time. The determination unit 33 approximates a relationship between the number of elapsed days and the number of times of writing operations to a straight line or a curved line by a least square method. A relational expression for predicting the number of times of writing operations in the future with respect to the number of elapsed days is obtained (a dotted curve in FIG. 11). The determination unit 33 substitutes known life information into the relational expression and calculates the number of days (usable period) when the flash memory reaches its life.

For example, when the usable time limit is within a fixed period (for example, five years) from the present, the determination unit 33 can determine that there is a malfunction or a probability of malfunction. The fixed period is determined in advance according to the component.

Referring again to FIG. 9, further description is given below. As a result of the analysis, when there is a malfunction or a probability of malfunction (Yes in step S103), the identification unit 32 extracts counter information related to the corresponding component from the log data in step S104. (i) First, the identification unit 32 refers to the log data and determines whether there is a certain period in which writing operation to the flash memory is frequently performed. The certain period of time is, for example, a date on which a malfunction is detected or a certain period of time (for example, up to three days before) preceding the date on which the malfunction is detected. When the number of times of writing operations in the certain period is equal to or greater than the threshold, the identification unit 32 identifies the certain period. (ii) Next, the identification unit 32 identifies parameters (the number of copies, the number of prints, the number of facsimile transmissions and receptions, the number of scans, the number of main power on times, and the number of energy saving shift or return times) that have increased by a threshold or more in the identified certain period based on the counter information included in the log data. For example, the counter information includes the number of prints. When the device 10 executes printing, the number of printed sheets increases. However, if writing operation to the flash memory occurs during execution of printing, the number of printed sheets also rapidly increases during the identified period. As described above, when the number of times of writing operations to the flash memory and the number of printed sheets increase in the same certain period, it can be determined that there is a relation between the number of times of writing operations to the flash memory and the number of printed sheets. It is possible to identify the number of prints that have increased by the threshold or more during a certain period in which the number of times of writing operations to the flash memory has increased by the threshold or more.

In step S105, the identification unit 32 refers to the application information storage unit 42 and identifies an application associated with the identified parameter. In other words, the identification unit 32 identifies software that caused increase in the counter information. That is, counter information in which the increase in the counter information is equal to or larger than the threshold in a certain period in which the increase in the number of times of writing operations is equal to or larger than the threshold is identified, and software associated with the type of the identified counter information is identified by referring to the application information storage unit 42. As a result, the application that caused the malfunction or is likely to cause the malfunction can be identified. Here, the application that is likely to cause the malfunction, is the application that is responsible for causing a high probability of malfunction that is higher than a threshold.

In step S106, the notification unit 34 refers to the application manager information storage unit 43, and transmits an e-mail describing information related to the malfunction to the application manager in charge of the application.

FIG. 12 is a diagram illustrating contents of an e-mail sent to an application manager. "Transmission date and time" 301 is a transmission date and time of the e-mail. "Transmitted by" 302 is a transmission source of the e-mail, for example, a "maintenance server". "Destination" 303 is the name of the application manager. "Subject" 304 is the subject of the e-mail. Notification of malfunction is the subject. "Malfunction detected in print application" 305 is a message indicating the name of the application and the fact that a malfunction has been detected. "Detection method" 306 is the method for detecting the malfunction, one of A to C described above. "Parameter" 307 is a parameter used for detection of the malfunction. "Customer ID" 308 is an identification information of a user (customer) who uses the device. "MFP ID" 309 is an identification information of the MFP.

The application manager who received the e-mail can analyze the malfunction and improve the application.

As described above, the maintenance system 100 according to the present embodiment can identify the component such as the flash memory having a malfunction or a probability of malfunction from the log data, identify a parameter related to the component from the log data, and identify an application associated with the parameter. Therefore, the application related to the malfunction can be identified as the cause of the malfunction of the device.

For example, in the present embodiment, detection of a malfunction of the device such as the multifunction peripheral has been described, but a malfunction of a machine tool such as a lathe or an industrial machine may be detected.

In addition, although the log data is mainly text data in the present embodiment, sound data inside the device or image data obtained by imaging the inside of the device may be used as the log data.

The apparatuses or devices described in one or more embodiments are just one example of plural computing environments that implement the one or more embodiments disclosed herein. In some embodiments, the maintenance server 30 includes multiple computing devices such as a server cluster. The plurality of computing devices is configured to communicate with one another through any type of communication link, including a network, shared memory, etc., and perform the processes disclosed herein.

In addition, the functional configuration as illustrated in FIG. 6 is divided into blocks based on main functions in order to facilitate understanding the processes performed by the device 10 and the maintenance server 30. The present disclosure is not limited by the way of dividing the processing unit or the name. Further, the processing of the device 10 and the maintenance server 30 can be divided into more processing units according to the processing content. Further, one process can be divided to include a larger number of processes.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing system comprising one or more information processing apparatuses, the information processing system including:
circuitry configured to:
receive, from a device having counter information stored therein, the counter information and a number of times of writing operations to one or more memories included in the device;
determine whether there is a malfunction, or a probability of malfunction based on the number of times of writing operations received from the device;
identify software that causes or is likely to cause the malfunction based on the counter information in response to determination of the malfunction, or the probability of malfunction;
predict a future number of times of writing operations from a relationship between a date and time when the number of times of writing operations is received from the device and the number of times of writing operations; and
determine whether there is a malfunction, or a probability of malfunction based on an expiration date during which the number of times of writing operations reaches a life of the one or more memories included in the device.

2. The information processing system of claim 1, wherein the circuitry is configured to identify the software that increases the counter information as the software that causes the malfunction.

3. The information processing system of claim 1, further comprising:
a first storage area configured to store software information in which the software is associated with a type of the counter information, and the circuitry is configured to;
identify the counter information in which an increase in the counter information is equal to or greater than a threshold in a certain time period, the certain time period being a time period in which the increase in the number of times of writing operations is equal to or greater than a threshold; and
identify, as the software causing the malfunction, the software associated with the type of the identified counter information by referring to the software information.

4. The information processing system of claim 1, further comprising:
a second storage area configured to store software information in association with a notification destination; and
in response to determination that there is a malfunction or a probability of malfunction, the circuitry is configured to notify the notification destination associated with the identified software by referring to the second storage area.

5. An information processing method performed by an information processing apparatus capable of communicating with a device through a network, the information processing method comprising:
receiving, from the device having counter information stored therein, the counter information and a number of times of writing operations to one or more memories included in the device;
determining whether there is a malfunction, or a probability of malfunction based on the number of times of writing operations received from the device;
identifying software that causes or is likely to cause the malfunction based on the counter information, in response to determination that there is a malfunction or a probability of malfunction;
predicting a future number of times of writing operations from a relationship between a date and time when the number of times of writing operations is received from the device and the number of times of writing operations; and
determining whether there is a malfunction, or a probability of malfunction based on an expiration date during which the number of times of writing operations reaches a life of the one or more memories included in the device.

6. A non-transitory recording medium storing a plurality of instructions which, when executed by one or more processors on an information processing system, causes the processors to perform an information processing method, comprising:
receiving, from a device having counter information stored therein, the counter information and a number of times of writing operations to one or more memories included in the device and counter information of the device;
determining whether there is a malfunction, or a probability of malfunction based on the number of times of writing operations received from the device;
identifying software that causes or is likely to cause the malfunction based on the counter information, in response to determination that there is a malfunction or a probability of malfunction;
predicting a future number of times of writing operations from a relationship between a date and time when the number of times of writing operations is received from the device and the number of times of writing operations; and
determining whether there is a malfunction, or a probability of malfunction based on an expiration date during which the number of times of writing operations reaches a life of the one or more memories included in the device.

* * * * *